United States Patent
Tojo

(10) Patent No.: US 11,499,882 B2
(45) Date of Patent: Nov. 15, 2022

(54) PRESSURE SENSOR

(71) Applicant: AZBIL CORPORATION, Tokyo (JP)

(72) Inventor: Hirofumi Tojo, Chiyoda-ku (JP)

(73) Assignee: AZBIL CORPORATION, Tokyo (JP)

( * ) Notice: Subject to any disclaimer, the term of this patent is extended or adjusted under 35 U.S.C. 154(b) by 143 days.

(21) Appl. No.: 17/064,145

(22) Filed: Oct. 6, 2020

(65) Prior Publication Data

US 2021/0108977 A1 Apr. 15, 2021

(30) Foreign Application Priority Data

Oct. 9, 2019 (JP) .............................. JP2019-185767

(51) Int. Cl.
| | | |
|---|---|---|
| G01L 9/04 | (2006.01) | |
| G01L 19/04 | (2006.01) | |
| G01L 9/00 | (2006.01) | |

(52) U.S. Cl.
CPC .............. *G01L 9/0051* (2013.01); *G01L 9/04* (2013.01)

(58) Field of Classification Search
CPC ...... G01L 9/00–08; G01L 9/0051; G01L 9/04
See application file for complete search history.

(56) References Cited

U.S. PATENT DOCUMENTS

| | | | | |
|---|---|---|---|---|
| 4,905,575 A | * | 3/1990 | Knecht | ................... F01B 19/00 73/718 |
| 5,959,213 A | | 9/1999 | Ikeda et al. | |
| 6,568,276 B1 | * | 5/2003 | Ciminelli | .............. G01L 9/0051 73/720 |
| 2013/0192378 A1 | | 8/2013 | Chiou et al. | |

FOREIGN PATENT DOCUMENTS

| | | |
|---|---|---|
| CN | 1140836 A | 1/1997 |
| CN | 103226047 A | 7/2013 |
| JP | 09-304206 | 11/1997 |
| JP | 2007-327976 A | 12/2007 |

OTHER PUBLICATIONS

Combined Chinese Office Action and Search Report dated Dec. 30, 2021 in Chinese Patent Application No. 202011055138.3 (with English translation), 17 pages

* cited by examiner

*Primary Examiner* — Nguyen Q. Ha
(74) *Attorney, Agent, or Firm* — Oblon, McClelland, Maier & Neustadt, L.L.P.

(57) ABSTRACT

A pressure sensor includes a sensor chip. The sensor chip has two diaphragms, recessed portions that serve as first pressure inlet chambers disposed so as to respectively adjoin top surfaces of the diaphragms, and recessed portions that serve as second pressure inlet chambers disposed so as to respectively adjoin bottom surfaces of the diaphragms. A cavity is provided in the sensor chip such that, when a difference between pressures respectively applied to a top surface and bottom surface of the diaphragm is zero, an output voltage of a Wheatstone bridge circuit made up of strain gauges provided in the diaphragm is zero.

11 Claims, 7 Drawing Sheets

PRESSURE SENSOR

CROSS-REFERENCE TO RELATED APPLICATIONS

The present application is based on and claims priority to Japanese Application No. 2019-185767, filed Oct. 9, 2019, the entire contents of which are incorporated herein by reference.

BACKGROUND DISCLOSURE

1. Field of the Disclosure

The present disclosure relates to a pressure sensor.

2. Description of the Related Art

Hitherto, a semiconductor piezoresistive pressure sensor in which a piezoresistance is formed in a semiconductor diaphragm that is a pressure sensing portion is known as a pressure sensor that detects a differential pressure or a pressure (see Japanese Unexamined Patent Application Publication No. 9-304206).

For example, a semiconductor pressure converter (which corresponds to a pressure sensor) described in Japanese Unexamined Patent Application Publication No. 9-304206 includes a single diaphragm and is capable of minimizing a zero shift and variations in zero shift due to temperature and static pressure by employing a symmetric structure.

On the other hand, when a pressure sensor including a plurality of diaphragms, that is, a pressure sensor integrating a plurality of functions and capable of detecting multiple pressures of the same type or different types, is assumed, the pressure sensor is not able to employ a symmetric structure. For this reason, the technique described in Japanese Unexamined Patent Application Publication No. 9-304206 cannot be applied to a pressure sensor including a plurality of diaphragms. Thus, even with the technique described in Japanese Unexamined Patent Application Publication No. 9-304206, it is difficult to achieve both integration of a plurality of functions and suppressing a decrease in the accuracy of a sensor.

SUMMARY

It is an object of the present disclosure to provide a new or improved pressure sensor capable of integrating a plurality of functions and suppressing a decrease in the accuracy of the sensor.

A pressure sensor according to an aspect of the present disclosure includes a planar sensor chip. The sensor chip includes a plurality of diaphragms, a plurality of first pressure inlet chambers disposed so as to respectively adjoin top surfaces of the plurality of diaphragms, a plurality of second pressure inlet chambers disposed so as to respectively adjoin bottom surfaces of the plurality of diaphragms, a first pressure inlet passage of which one end is open at a bottom surface of the sensor chip and an other end communicates with at least one of the plurality of first pressure inlet chambers, a second pressure inlet passage of which one end is open at the bottom surface or a side surface of the sensor chip and an other end communicates with at least one of the plurality of second pressure inlet chambers, and a plurality of strain gauges disposed for each diaphragm at a peripheral portion of each of the plurality of diaphragms. At least one cavity is provided for each diaphragm around the plurality of diaphragms such that, when a difference in between pressures respectively applied to a top surface and bottom surface of the diaphragm is zero, an output voltage of a Wheatstone bridge circuit made up of the plurality of strain gauges provided for the diaphragm is zero.

In one configuration example (first embodiment) of the pressure sensor according to the aspect of the present disclosure, two of each of the diaphragm, the first pressure inlet chamber, and the second pressure inlet chamber may be provided, one end of the first pressure inlet passage may be open at the bottom surface of the sensor chip, and two other ends diverging from a location between the two first pressure inlet chambers may respectively communicate with the two first pressure inlet chambers, and one end of the second pressure inlet passage may be open at the bottom surface of the sensor chip, and an other end of the second pressure inlet passage may communicate with one of the two second pressure inlet chambers.

In one configuration example (second embodiment) of the pressure sensor according to the aspect of the present disclosure, two of each of the diaphragm, the first pressure inlet chamber, and the second pressure inlet chamber may be provided, one end of the first pressure inlet passage may be open at the bottom surface of the sensor chip, and two other ends diverging from a location between the two first pressure inlet chambers may respectively communicate with the two first pressure inlet chambers, and one end of the second pressure inlet passage may be open at the bottom surface of the sensor chip, and two other ends diverging from a location between the two second pressure inlet chambers may respectively communicate with the two second pressure inlet chambers.

In one configuration example (third embodiment) of the pressure sensor according to the aspect of the present disclosure, two of each of the diaphragm, the first pressure inlet chamber, and the second pressure inlet chamber may be provided, one end of the first pressure inlet passage may be open at the bottom surface of the sensor chip, an other end of the first pressure inlet passage may communicate with one of the two first pressure inlet chambers, and a further other end of the first pressure inlet passage may communicate with one of the two second pressure inlet chambers, and one end of the second pressure inlet passage may be open at the bottom surface of the sensor chip, an other end of the second pressure inlet passage may communicate with one of the two first pressure inlet chambers, not communicating with the first pressure inlet passage, and a further other end of the second pressure inlet passage may communicate with one of the two second pressure inlet chambers, not communicating with the first pressure inlet passage.

In one configuration example (fourth embodiment) of the pressure sensor according to the aspect of the present disclosure, two of each of the diaphragm, the first pressure inlet chamber, and the second pressure inlet chamber may be provided, one end of the first pressure inlet passage may be open at the bottom surface of the sensor chip, and two other ends diverging from a location between the two first pressure inlet chambers may respectively communicate with the two first pressure inlet chambers, and one end of the second pressure inlet passage may be open at the side surface of the sensor chip, and an other end of the second pressure inlet passage may communicate with one of the two second pressure inlet chambers.

In one configuration example (fifth embodiment) of the pressure sensor according to the aspect of the present disclosure, four of each of the diaphragm, the first pressure inlet chamber, and the second pressure inlet chamber may be provided, one end of the first pressure inlet passage may be open at the bottom surface of the sensor chip, and four other ends diverging from a location between the four first pressure inlet chambers may respectively communicate with the four first pressure inlet chambers, one end of the second pressure inlet passage may be open at the bottom surface of the sensor chip, and two other ends diverging from a location between the four second pressure inlet chambers may respectively communicate with two of the four second pressure inlet chambers, and the sensor chip may further have a third pressure inlet passage, of which one end is open at the side surface of the sensor chip and an other end communicates with one of the four second pressure inlet chambers, not communicating with the second pressure inlet passage.

In one configuration example (first or second embodiment) of the pressure sensor according to the aspect of the present disclosure, the sensor chip may include a planar first member, a planar second member joined with the first member, and a planar third member joined with the second member, the first pressure inlet chamber may be provided at a location where the diaphragm provided at a top surface of the second member is covered, as a first recessed portion formed by removing part of a bottom surface side of the third member such that a top surface side of the third member is left, the second pressure inlet chamber may be provided as a second recessed portion formed by removing a bottom surface side of the second member such that the diaphragm at a top surface side of the second member is left, the first pressure inlet passage may include a first through-hole extending through the first member from a bottom surface to a top surface, a second through-hole extending through the second member from a bottom surface to the top surface so as to communicate with the first through-hole, and a first groove provided at a bottom surface of the third member such that both ends respectively communicate with the two first recessed portions and a middle portion communicates with the second through-hole, the second pressure inlet passage may include a third through-hole extending through the first member from the bottom surface to the top surface, and a second groove provided at the bottom surface of the second member such that one end communicates with one of the two second recessed portions and an other end communicates with the third through-hole or such that both ends respectively communicate with the two second recessed portions and a middle portion communicates with the third through-hole, and the cavity may be formed by a third groove provided at the top surface of the first member.

In one configuration example (third embodiment) of the pressure sensor according to the aspect of the present disclosure, the sensor chip may include a planar first member, a planar second member joined with the first member, and a planar third member joined with the second member, the first pressure inlet chamber may be provided at a location where the diaphragm provided at a top surface of the second member is covered, as a first recessed portion formed by removing part of a bottom surface side of the third member such that a top surface side of the third member is left, the second pressure inlet chamber may be provided as a second recessed portion formed by removing a bottom surface side of the second member such that the diaphragm at a top surface side of the second member is left, the first pressure inlet passage may include a first through-hole extending through the first member from a bottom surface to a top surface, a second through-hole extending through the second member from a bottom surface to the top surface so as to communicate with the first through-hole, a first groove provided at a bottom surface of the third member such that one end communicates with one of the two first recessed portions and an other end communicates with the second through-hole, and a second groove provided at the bottom surface of the second member such that one end communicates with one of the two second recessed portions and an other end communicates with the second through-hole, the second pressure inlet passage may include a third through-hole extending through the first member from the bottom surface to the top surface, a fourth through-hole extending through the second member from the bottom surface to the top surface so as to communicate with the third through-hole, a third groove provided at the bottom surface of the third member such that one end communicates with one of the two first recessed portions, not communicating with the first pressure inlet passage, and an other end communicates with the fourth through-hole, and a fourth groove provided at the bottom surface of the second member such that one end communicates with one of the two second recessed portions, not communicating with the first pressure inlet passage, and an other end communicates with the fourth through-hole, and the cavity may be formed by a fifth groove provided at the top surface of the first member.

In one configuration example (fourth embodiment) of the pressure sensor according to the aspect of the present disclosure, the sensor chip may include a planar first member, a planar second member joined with the first member, and a planar third member joined with the second member, the first pressure inlet chamber may be provided at a location where the diaphragm provided at a top surface of the second member is covered, as a first recessed portion formed by removing part of a bottom surface side of the third member such that a top surface side of the third member is left, the second pressure inlet chamber may be provided as a second recessed portion formed by removing a bottom surface side of the second member such that the diaphragm at a top surface side of the second member is left, the first pressure inlet passage may include a first through-hole extending through the first member from a bottom surface to a top surface, a second through-hole extending through the second member from a bottom surface to the top surface so as to communicate with the first through-hole, and a first groove provided at a bottom surface of the third member such that both ends respectively communicate with the two first recessed portions and a middle portion communicates with the second through-hole, the second pressure inlet passage may include a second groove provided at the bottom surface of the second member such that one end is open at the side surface of the second member and an other end communicates with one of the two second recessed portions, and the cavity may be formed by a third groove provided at the top surface of the first member.

In one configuration example (fifth embodiment) of the pressure sensor according to the aspect of the present disclosure, the sensor chip may include a planar first member, a planar second member joined with the first member, and a planar third member joined with the second member, the first pressure inlet chamber may be provided at a location where the diaphragm provided at a top surface of the second member is covered, as a first recessed portion formed by removing part of a bottom surface side of the third member such that a top surface side of the third member is left, the second pressure inlet chamber may be provided as a second recessed portion formed by removing a bottom surface side of the second member such that the diaphragm at a top surface side of the second member is left, the first pressure inlet passage may include a first through-hole extending through the first member from a bottom surface to a top surface, a second through-hole extending through the second member from a bottom surface to the top surface so as to communicate with the first through-hole, and a first groove provided at a bottom surface of the third member such that four distal ends diverging from a location between the four first recessed portions respectively communicate with the four first recessed portions and a portion at the diverging location communicates with the second through-hole, the second pressure inlet passage may include a third through-hole extending through the first member from a bottom surface to a top surface, and a second groove provided at the bottom surface of the second member such that both ends respectively communicate with the two second recessed portions and a middle portion communicates with the third through-hole, the third pressure inlet passage may include a third groove provided at the bottom surface of the second member such that one end is open at the side surface of the second member and an other end communicates with one of the four second recessed portions, not communicating with the second pressure inlet passage, and the cavity may be formed by a fourth groove provided at the top surface of the first member.

In one configuration example (one of the first to fifth embodiments) of the pressure sensor according to the aspect of the present disclosure, the four strain gauges may be provided for each diaphragm, the Wheatstone bridge circuit may include a first series circuit provided by serially connecting the first and second strain gauges out of the four strain gauges, a second series circuit provided by serially connecting the third and fourth strain gauges out of the four strain gauges, and a power supply that applies a driving voltage to both ends of the first series circuit and both ends of the second series circuit, and the cavity may be formed such that, when a difference between pressures respectively applied to a top surface and bottom surface of the diaphragm is zero, the output voltage that is output from between a connection point of the first and second strain gauges and a connection point of the third and fourth strain gauges is zero.

DETAILED DESCRIPTION

First Embodiment

Figure 1:
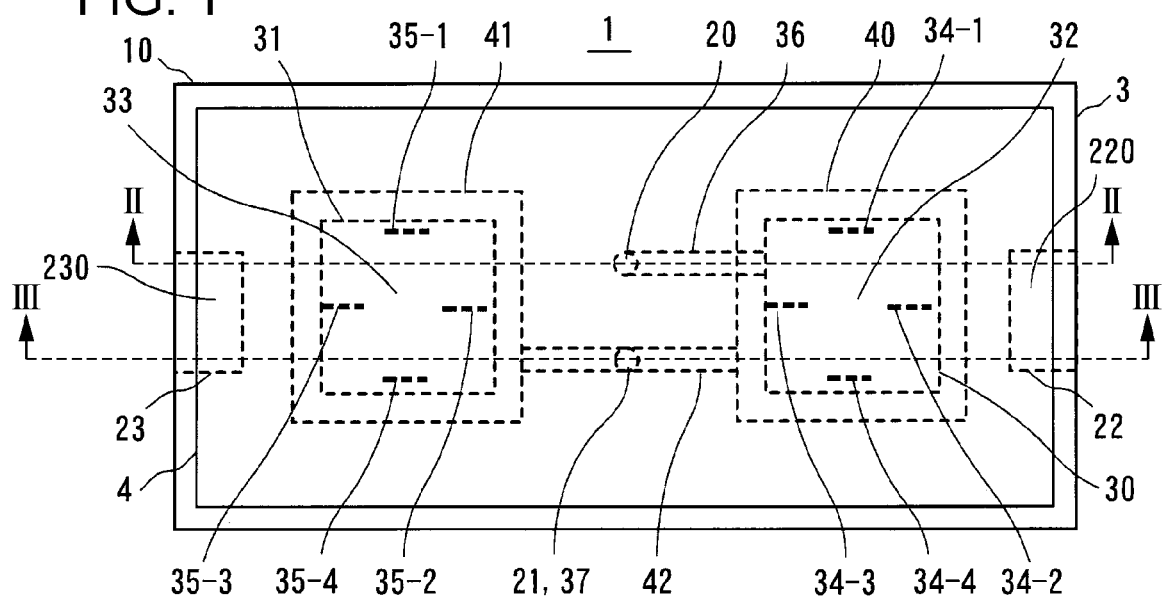
FIG. 1 is a plan view of a pressure sensor according to a first embodiment of the present disclosure.
Figure 2:
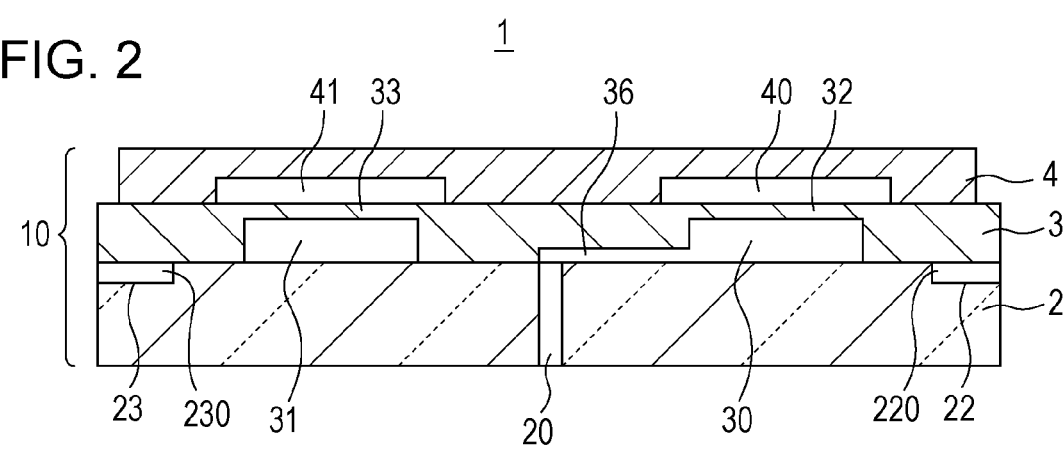
FIG. 2 is a cross-sectional view of the pressure sensor according to the first embodiment of the present disclosure.
Figure 3:
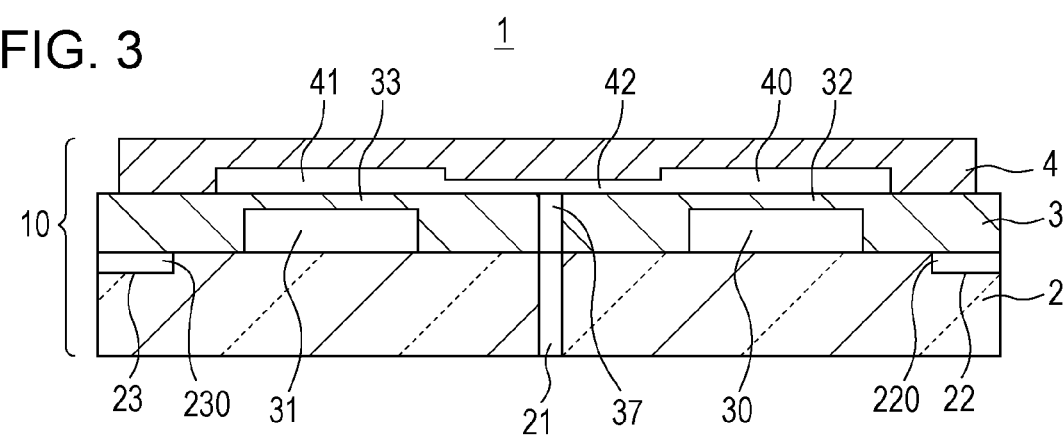
FIG. 3 is a cross-sectional view of the pressure sensor according to the first embodiment of the present disclosure.

Hereinafter, an embodiment of the present disclosure will be described with reference to the attached drawings. FIG. 1 is a plan view of a pressure sensor according to a first embodiment of the present disclosure. FIG. 2 is a cross-sectional view taken along the line II-II in FIG. 1. FIG. 3 is a cross-sectional view taken along the line III-III in FIG. 1. The pressure sensor 1 is made up of a planar sensor chip 10. The sensor chip 10 is made up of a planar base 2 (first member) made of Pyrex glass, a planar pressure sensing member 3 (second member) made of silicon and joined with the base 2, and a planar lid member 4 (third member) made of silicon and joined with the pressure sensing member 3.

The base 2 has two through-holes 20, 21 (third and first through-holes) that extend through the base 2 from the back surface (bottom surface) to the front surface (top surface) and that serve as pressure inlet passages. In addition, the base 2 has grooves 22, 23 for providing cavities (described later).

Two square recessed portions 30, 31 (second pressure inlet chambers) are formed on the back surface of the pressure sensing member 3, facing the base 2. The recessed portions 30, 31 are formed by removing part of the back surface side of the pressure sensing member 3 such that the front surface side of the pressure sensing member 3 is left. Portions of the pressure sensing member 3 left on the front surface side of regions where the recessed portions 30, 31 are formed serve as diaphragms 32, 33. A groove 36 (second groove) that serves as a pressure inlet passage is formed on the back surface of the pressure sensing member 3. One end of the groove 36 communicates with the recessed portion 30, and, when the base 2 and the pressure sensing member 3 are joined with each other, the other end of the groove 36 communicates with the through-hole 20.

Strain gauges 34-1 to 34-4, 35-1 to 35-4 are formed by a technique, such as impurity diffusion and ion implantation, at the peripheral portions of the diaphragms 32, 33 formed on the front surface sides of the regions of the recessed portions 30, 31 on the front surface of the pressure sensing member 3, facing the lid member 4. The strain gauges 34-1 to 34-4, 35-1 to 35-4 function as piezoresistive elements. The strain gauges 34-1 to 34-4 are respectively formed near the middle points of the four sides of the square diaphragm 32 in plan view. Similarly, the strain gauges 35-1 to 35-4 are respectively formed near the middle points of the four sides of the square diaphragm 33 in plan view. The pressure sensing member 3 is made of a p-type monocrystal silicon of which the crystal plane orientation is a (100) plane. Each of the strain gauges 34-1 to 34-4, 35-1 to 35-4 is formed parallel to a crystal orientation of <110> at which a piezoresistive coefficient is maximum in the crystal plane orientation (100) of the pressure sensing member 3.

The pressure sensing member 3 has a through-hole 37 (second through-hole) at a location where, when the base 2 and the pressure sensing member 3 are joined with each other, the through-hole 37 communicates with the through-hole 21. The through-hole 37 extends through the pressure sensing member 3 from the back surface to the front surface and serves as a pressure inlet passage.

The lid member 4 is made of, for example, a p-type monocrystal silicon of which the crystal plane orientation is a (100) plane. Two square recessed portions 40, 41 (first pressure inlet chambers) are formed on the back surface of the lid member 4, facing the pressure sensing member 3, at a location where, when the pressure sensing member 3 and the lid member 4 are joined with each other, the diaphragms 32, 33 are covered. The recessed portions 40, 41 are formed by removing part of the back surface side of the lid member 4 such that the front surface side of the lid member 4 is left. A groove 42 (first groove) that serves as a pressure inlet passage is formed on the back surface of the lid member 4. One end of the groove 42 communicates with the recessed portion 40, the other end of the groove 42 communicates with the recessed portion 41, and, when the pressure sensing member 3 and the lid member 4 are joined with each other, the middle portion of the groove 42 communicates with the through-hole 37.

Of course, the through-holes 20, 21, 37, the recessed portions 30, 31, 40, 41, and the grooves 22, 23, 36, 42 can be easily formed by an etching technique. The through-holes, recessed portions, and grooves of the following embodiments can also be easily formed by an etching technique similarly.

The base 2 and the pressure sensing member 3 are directly joined with each other such that the through-hole 20 of the base 2 and the groove 36 of the pressure sensing member 3 communicate with each other.

The pressure sensing member 3 and the lid member 4 are directly joined with each other such that the recessed portions 40, 41 of the lid member 4 respectively cover the diaphragms 32, 33 of the pressure sensing member 3 and the through-hole 37 of the pressure sensing member 3 and the groove 42 of the lid member 4 communicate with each other.

First oil is able to reach the top surfaces of the diaphragms 32, 33 via the through-holes 21, 37, the groove 42, and the recessed portions 40, 41. The first oil transmits an applied first pressure to the top surfaces of the diaphragms 32, 33. Second oil is able to reach the bottom surface of the diaphragm 32 via the through-hole 20, the groove 36, and the recessed portion 30. The second oil transmits an applied second pressure to the bottom surface of the diaphragm 32. The recessed portion 31 on the bottom surface of the diaphragm 33 is hermetically sealed in a vacuum state.

The planar shape of the lid member 4 is smaller than the planar shape of the pressure sensing member 3, and the front surface of the pressure sensing member 3 is exposed. Although not shown in FIG. 1, eight electrode pads are respectively electrically connected to the strain gauges 34-1 to 34-4, 35-1 to 35-4 are formed on the exposed front surface of the pressure sensing member 3. Thus, the strain gauges 34-1 to 34-4, 35-1 to 35-4 are able to be connected to external circuits. A method of connecting the strain gauges and the external circuits is also similar to those of the following embodiments.

Figure 4:
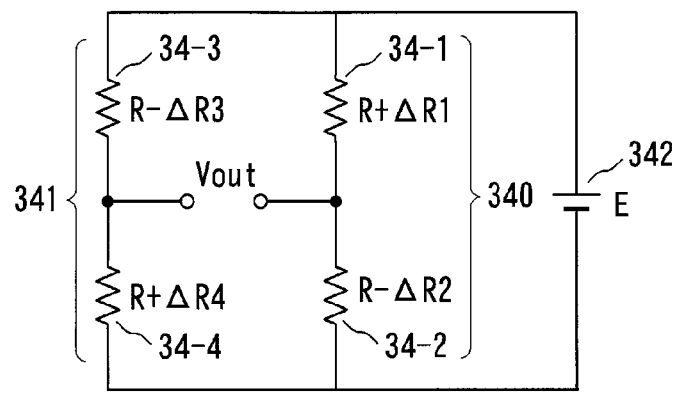
FIG. 4 is a circuit diagram of a Wheatstone bridge circuit of the pressure sensor according to the first embodiment of the present disclosure.

The strain gauges 34-1 to 34-4 make up a Wheatstone bridge circuit for measuring a differential pressure as shown in FIG. 4 together with an external circuit. The Wheatstone bridge circuit of FIG. 4 makes up a first series circuit 340 by serially connecting the first strain gauge 34-1 and the second strain gauge 34-2 located adjacent to the first strain gauge 34-1 and also makes up a second series circuit 341 by serially connecting the third strain gauge 34-3 located adjacent to the first strain gauge 34-1 and the fourth strain gauge 34-4 located opposite the first strain gauge 34-1. The Wheatstone bridge circuit is configured to apply a Wheatstone bridge driving voltage E by using a power supply 342 to both ends of the first series circuit 340 and both ends of the second series circuit 341. An output voltage Vout corresponding to a differential pressure between the first pressure and the second pressure is output from between the connection point of the strain gauges 34-1, 34-2 and the connection point of the strain gauges 34-3, 34-4.

R denotes the resistance values of the strain gauges 34-1 to 34-4. $\Delta R1$, $\Delta R2$, $\Delta R3$, $\Delta R4$ denote the resistance changes of the strain gauges 34-1 to 34-4 when stress occurs in the diaphragm 32 in response to a differential pressure. With the Wheatstone bridge circuit of FIG. 4, it is possible to measure a differential pressure between the first pressure applied to the top surface of the diaphragm 32 and the second pressure applied to the bottom surface of the diaphragm 32.

The strain gauges 35-1 to 35-4 make up a Wheatstone bridge circuit for measuring an absolute pressure together with an external circuit. With the Wheatstone bridge circuit for measuring an absolute pressure, it is possible to measure the absolute pressure of the first pressure applied to the top surface of the diaphragm 33. The Wheatstone bridge circuit for measuring an absolute pressure corresponds to the one in which the strain gauges 34-1 to 34-4 in FIG. 4 are replaced with the strain gauges 35-1 to 35-4.

In the present embodiment, the two diaphragms, that is, the diaphragm 32 for measuring a differential pressure and the diaphragm 33 for measuring an absolute pressure, are provided, and a pressure inlet passage is formed between the diaphragms 32, 33, so it is difficult to employ a symmetric structure for the diaphragm 32, and, similarly, it is also difficult to employ a symmetric structure for the diaphragm 33.

In this way, it is difficult to employ a symmetric structure for the diaphragm 32, so the resistance value shifts $\Delta R1$, $\Delta R2$, $\Delta R3$, $\Delta R4$ that respectively occur in the strain gauges 34-1 to 34-4 are different values. Therefore, the output voltage Vout of the Wheatstone bridge circuit for measuring a differential pressure is expressed by the following expression.

$$\begin{aligned}
Vout &= \{(1 + \Delta R4/R)(2 + \Delta R1/R - \Delta R2/R) - \\
&\quad (1 - \Delta R2/R)(2 + \Delta R4/R - \Delta R3/R)\} \\
&\quad E/\{(2 + \Delta R4/R - \Delta R3/R) \\
&\quad (2 + \Delta R1/R - \Delta R2/R)\} \\
&= \{(1 + \sigma 4)(2 + \sigma 1 - \sigma 2) - \\
&\quad (1 - \sigma 2)(2 + \sigma 4 - \sigma 3)\}E/\{(2 + 
\end{aligned} \qquad (1)$$

$$\sigma 4 - \sigma 3)(2 + \sigma 1 - \sigma 2)\}$$

In the expression (1), the radial stresses of the diaphragm 32, applied to the strain gauges 34-1 to 34-4, are respectively denoted by σr1, σr2, σr3, and σr4. The tangential stresses of the diaphragm 32, applied to the strain gauges 34-1 to 34-4, are respectively denoted by σθ1, σθ2, σθ3, and σθ4. In the expression (1), σ1, σ2, σ3, σ4 are expressed as follows.

$$\sigma 1 = \Delta R1/R = \pi \times (\sigma r1 - \sigma \theta 1)/2 \quad (2)$$

$$\sigma 2 = \Delta R2/R = \pi \times (\sigma r2 - \sigma \theta 2)/2 \quad (3)$$

$$\sigma 3 = \Delta R3/R = \pi \times (\sigma r3 - \sigma \theta 3)/2 \quad (4)$$

$$\sigma 4 = \Delta R4/R = \pi \times (\sigma r4 - \sigma \theta 4)/2 \quad (5)$$

For the Wheatstone bridge circuit for measuring an absolute pressure as well, where resistance value shifts that occur in the strain gauges 35-1 to 35-4 are respectively denoted by ΔR1, ΔR2, ΔR3, and ΔR4, the output voltage Vout of the Wheatstone bridge circuit for measuring an absolute pressure is expressed by the expression (1).

In the present embodiment, it is difficult to employ a symmetric structure for the diaphragm 32; however, by providing a cavity 220 (non-joint portion) where the base 2 and the pressure sensing member 3 are not joined with each other by forming a groove 22 in the base 2, it is possible to adjust stresses applied to the strain gauges 34-1 to 34-4. Specifically, the cavity 220 may be provided such that, when a difference between pressures respectively applied to a top surface and bottom surface of the diaphragm 32 is zero, the output voltage Vout of the Wheatstone bridge circuit for measuring a differential pressure is zero.

Similarly, by providing a cavity 230 where the base 2 and the pressure sensing member 3 are not joined with each other by forming a groove 23 in the base 2, it is possible to adjust stresses applied to the strain gauges 35-1 to 35-4. Specifically, the cavity 230 may be provided such that, when a difference between pressures respectively applied to a top surface and bottom surface of the diaphragm 33 is zero, the output voltage Vout of the Wheatstone bridge circuit for measuring an absolute pressure is zero.

In this way, in the present embodiment, by providing the two diaphragms 32, 33, it is possible to measure a differential pressure and an absolute pressure at a time with high sensitivity, and, by providing the cavities 220, 230, it is possible to suppress the zero shift of the output voltage Vout due to temperature and static pressure for each of a differential pressure and an absolute pressure.

Second Embodiment

Figure 5:
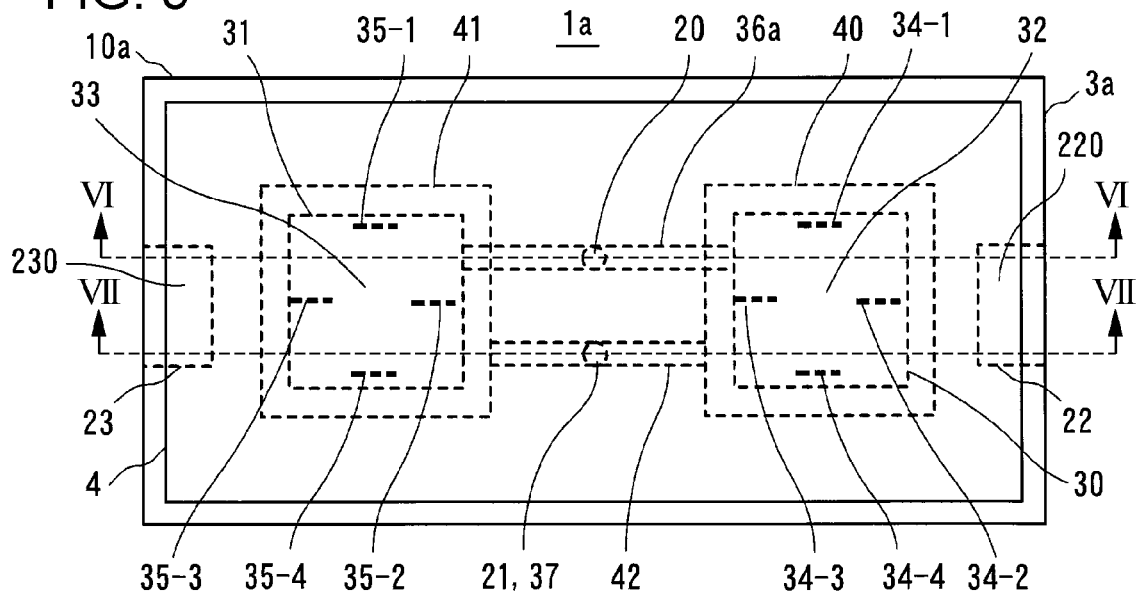
FIG. 5 is a plan view of a pressure sensor according to a second embodiment of the present disclosure.
Figure 6:
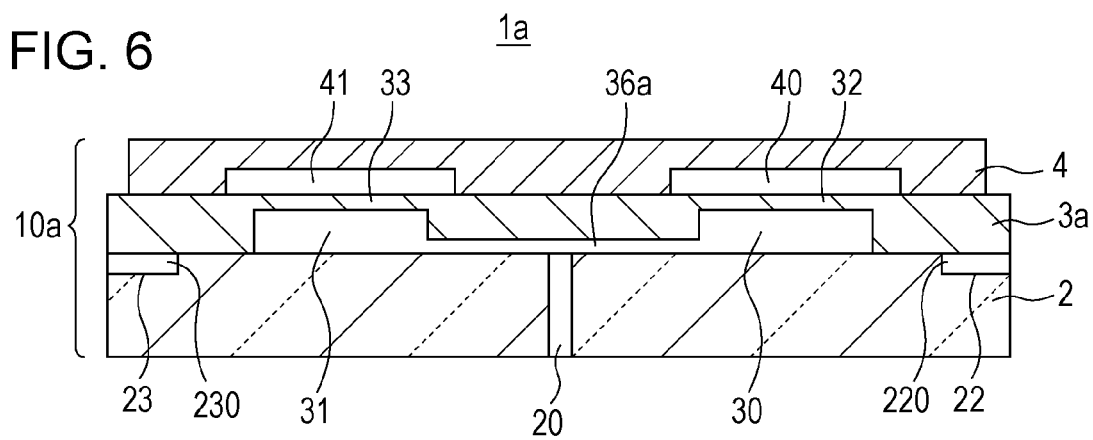
FIG. 6 is a cross-sectional view of the pressure sensor according to the second embodiment of the present disclosure.
Figure 7:
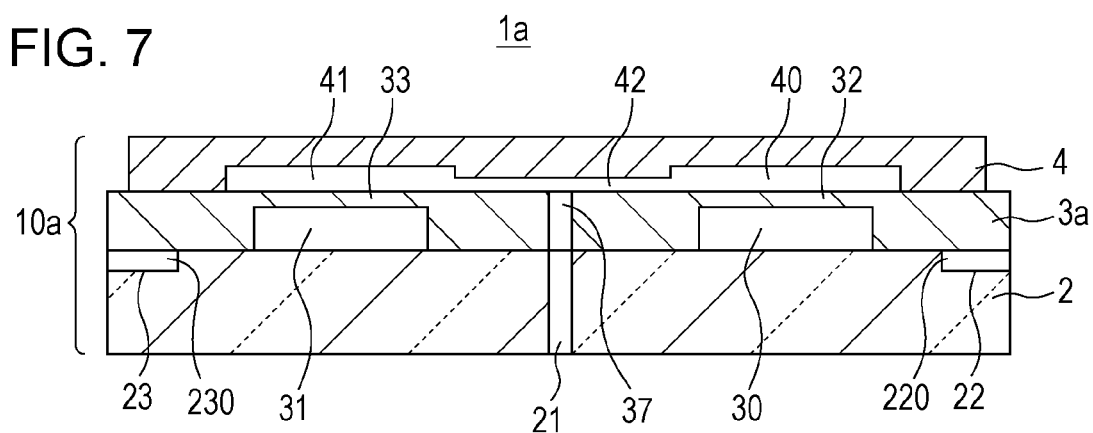
FIG. 7 is a cross-sectional view of the pressure sensor according to the second embodiment of the present disclosure.

Next, a second embodiment of the present disclosure will be described. FIG. 5 is a plan view of a pressure sensor according to the second embodiment of the present disclosure. FIG. 6 is a cross-sectional view taken along the line VI-VI in FIG. 5. FIG. 7 is a cross-sectional view taken along the line VII-VII in FIG. 5. The present embodiment is an example of measuring two differential pressures at a time.

The pressure sensor 1a of the present embodiment is made up of a planar sensor chip 10a. The sensor chip 10a is made up of a planar base 2 (first member) made of Pyrex glass, a planar pressure sensing member 3a (second member) made of silicon and joined with the base 2, and a planar lid member 4 (third member) made of silicon and joined with the pressure sensing member 3a. The base 2 and the lid member 4 are those as described in the first embodiment.

As in the case of the first embodiment, the pressure sensing member 3a has two recessed portions 30, 31, two diaphragms 32, 33, eight strain gauges 34-1 to 34-4, 35-1 to 35-4, and a through-hole 37.

In addition, a groove 36a (second groove) that serves as a pressure inlet passage is formed on the back surface of the pressure sensing member 3a. One end of the groove 36a communicates with the recessed portion 30, the other end of the groove 36a communicates with the recessed portion 31, and, when the base 2 and the pressure sensing member 3a are joined with each other, the middle portion of the groove 36a communicates with the through-hole 20.

The base 2 and the pressure sensing member 3a are directly joined with each other such that the through-hole 20 of the base 2 and the groove 36a of the pressure sensing member 3a communicate with each other.

The pressure sensing member 3a and the lid member 4 are directly joined with each other such that the recessed portions 40, 41 of the lid member 4 respectively cover the diaphragms 32, 33 of the pressure sensing member 3a and the through-hole 37 of the pressure sensing member 3a and the groove 42 of the lid member 4 communicate with each other.

As in the case of the first embodiment, first oil is able to reach the top surfaces of the diaphragms 32, 33 via the through-holes 21, 37, the groove 42, and the recessed portions 40, 41. The first oil transmits an applied first pressure to the top surfaces of the diaphragms 32, 33. Second oil is able to reach the bottom surfaces of the diaphragms 32, 33 via the through-hole 20, the groove 36a, and the recessed portions 30, 31. The second oil transmits an applied second pressure to the bottom surfaces of the diaphragms 32, 33.

The strain gauges 34-1 to 34-4 make up a Wheatstone bridge circuit for measuring a differential pressure as shown in FIG. 4 together with an external circuit. The strain gauges 35-1 to 35-4 make up a Wheatstone bridge circuit for measuring a differential pressure together with an external circuit. The Wheatstone bridge circuit made up of the strain gauges 35-1 to 35-4 corresponds to the one in which the strain gauges 34-1 to 34-4 in FIG. 4 are replaced with the strain gauges 35-1 to 35-4.

In the present embodiment, as well as the first embodiment, a cavity 220 is provided such that, when a difference between pressures applied to a top surface and bottom surface of the diaphragm 32 is zero, the output voltage Vout of the Wheatstone bridge circuit for measuring a differential pressure, made up of the strain gauges 34-1 to 34-4, is zero. In addition, a cavity 230 is provided such that, when a difference between pressures applied to a top surface and bottom surface of the diaphragm 33 is zero, the output voltage Vout of the Wheatstone bridge circuit for measuring a differential pressure, made up of the strain gauges 35-1 to 35-4, is zero.

In this way, in the present embodiment, it is possible to separately measure the same differential pressure with the two diaphragms 32, 33, and, by providing the cavities 220, 230, it is possible to suppress the zero shift of the output voltage Vout due to temperature and static pressure.

In the first embodiment and the present embodiment, the diaphragms 32, 33 have the same size. In the present embodiment, the same differential pressure is measured by the two diaphragms 32, 33, so the sizes of the diaphragms 32, 33 may be changed to vary the sensitivities of the diaphragms 32, 33 for measuring a differential pressure.

Third Embodiment

Figure 8:
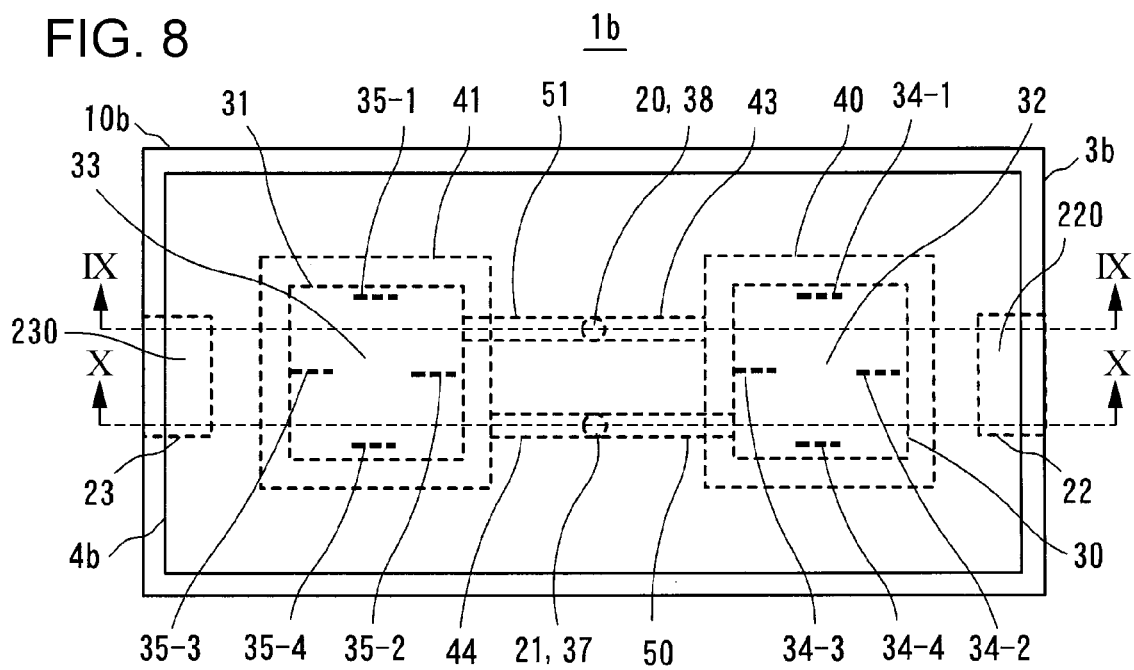
FIG. 8 is a plan view of a pressure sensor according to a third embodiment of the present disclosure.
Figure 9:
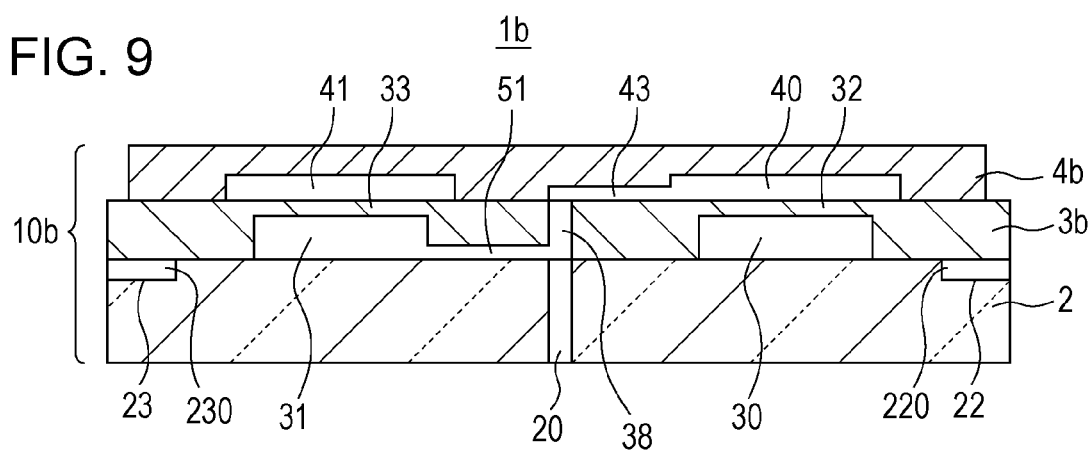
FIG. 9 is a cross-sectional view of the pressure sensor according to the third embodiment of the present disclosure.
Figure 10:
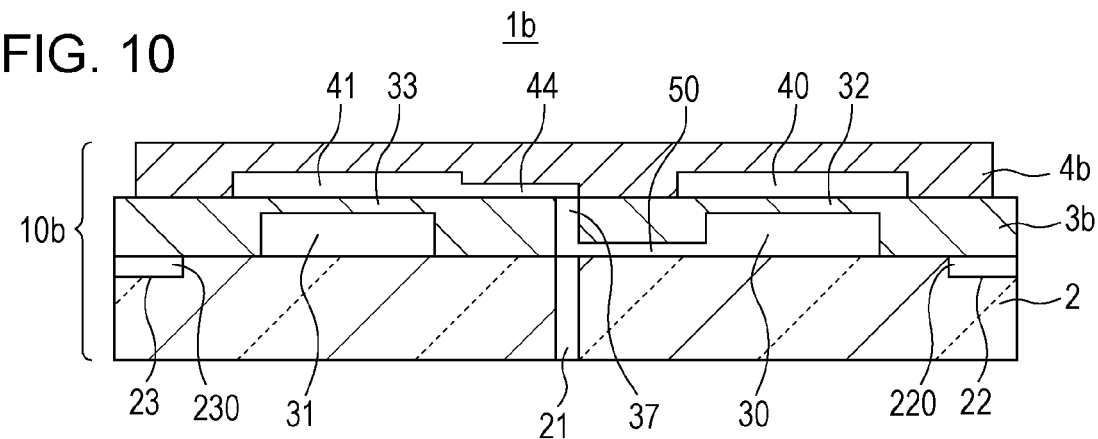
FIG. 10 is a cross-sectional view of the pressure sensor according to the third embodiment of the present disclosure.

Next, a third embodiment of the present disclosure will be described. FIG. 8 is a plan view of a pressure sensor according to the third embodiment of the present disclosure. FIG. 9 is a cross-sectional view taken along the line IX-IX in FIG. 8. FIG. 10 is a cross-sectional view taken along the line X-X in FIG. 8. The present embodiment is another example of measuring two differential pressures at a time.

The pressure sensor 1b of the present embodiment is made up of a planar sensor chip 10b. The sensor chip 10b is made up of a planar base 2 (first member) made of Pyrex glass, a planar pressure sensing member 3b (second member) made of silicon and joined with the base 2, and a planar lid member 4b (third member) made of silicon and joined with the pressure sensing member 3b. The base 2 is that as described in the first embodiment.

As in the case of the first embodiment, the pressure sensing member 3b has two recessed portions 30, 31, two diaphragms 32, 33, eight strain gauges 34-1 to 34-4, 35-1 to 35-4, and a through-hole 37.

The pressure sensing member 3b has a through-hole 38 (fourth through-hole) at a location where, when the base 2 and the pressure sensing member 3b are joined with each other, the through-hole 38 communicates with the through-hole 20. The through-hole 38 extends through the pressure sensing member 3b from the back surface to the front surface and serves as a pressure inlet passage.

In addition, a groove 50 (second groove) that serves as a pressure inlet passage and a groove 51 (fourth groove) that serves as a pressure inlet passage are formed on the back surface of the pressure sensing member 3b. One end of the groove 50 communicates with the recessed portion 30, and the other end of the groove 50 communicates with the through-hole 37. One end of the groove 51 communicates with the recessed portion 31, and the other end of the groove 51 communicates with the through-hole 38. In this way, one ends of the two grooves 50, 51 respectively communicate with the different recessed portions 30, 31, and the other ends of the two grooves 50, 51 respectively communicate with the different through-holes 37, 38.

As in the case of the first embodiment, the lid member 4b has two recessed portions 40, 41. A groove 43 (third groove) that serves as a pressure inlet passage and a groove 44 (first groove) that serves as a pressure inlet passage are formed on the back surface of the lid member 4b. One end of the groove 43 communicates with the recessed portion 40, and, when the pressure sensing member 3b and the lid member 4b are joined with each other, the other end of the groove 43 communicates with the through-hole 38. One end of the groove 44 communicates with the recessed portion 41, and, when the pressure sensing member 3b and the lid member 4b are joined with each other, the other end of the groove 44 communicates with the through-hole 37. In this way, one ends of the two grooves 43, 44 respectively communicate with the different recessed portions 40, 41, and the other ends of the two grooves 43, 44 respectively communicate with the different through-holes 37, 38.

The base 2 and the pressure sensing member 3b are directly joined with each other such that the through-holes 20, 21 of the base 2 and the through-holes 38, 37 of the pressure sensing member 3b respectively communicate with each other.

The pressure sensing member 3b and the lid member 4b are directly joined with each other such that the recessed portions 40, 41 of the lid member 4b cover the diaphragms 32, 33 of the pressure sensing member 3b, the through-hole 37 of the pressure sensing member 3b and the groove 44 of the lid member 4b communicate with each other, and the through-hole 38 of the pressure sensing member 3b and the groove 43 of the lid member 4b communicate with each other.

First oil reaches the top surface of the diaphragm 32 via the through-holes 20, 38, the groove 43, and the recessed portion 40. First oil reaches the bottom surface of the diaphragm 33 via the through-hole 20, the groove 51, and the recessed portion 31. The first oil transmits an applied first pressure to the top surface of the diaphragm 32 and the bottom surface of the diaphragm 33.

Second oil reaches the bottom surface of the diaphragm 32 via the through-hole 21, the groove 50, and the recessed portion 30. Second oil reaches the top surface of the diaphragm 33 via the through-holes 21, 37, the groove 44, and the recessed portion 41. The second oil transmits an applied second pressure to the bottom surface of the diaphragm 32 and the top surface of the diaphragm 33.

The strain gauges 34-1 to 34-4 make up a Wheatstone bridge circuit for measuring a differential pressure as shown in FIG. 4 together with an external circuit. The strain gauges 35-1 to 35-4 make up a Wheatstone bridge circuit for measuring a differential pressure together with an external circuit. The Wheatstone bridge circuit made up of the strain gauges 35-1 to 35-4 corresponds to the one in which the strain gauges 34-1 to 34-4 in FIG. 4 are replaced with the strain gauges 35-1 to 35-4.

In the present embodiment, as well as the first embodiment, a cavity 220 is provided such that, when a difference between pressures applied to a top surface and bottom surface of the diaphragm 32 is zero, the output voltage Vout of the Wheatstone bridge circuit for measuring a differential pressure, made up of the strain gauges 34-1 to 34-4, is zero. In addition, a cavity 230 is provided such that, when a difference between pressures applied to a top surface and bottom surface of the diaphragm 33 is zero, the output voltage Vout of the Wheatstone bridge circuit for measuring a differential pressure, made up of the strain gauges 35-1 to 35-4, is zero.

In this way, in the present embodiment, it is possible to separately measure the same differential pressure with the two diaphragms 32, 33, and, by providing the cavities 220, 230, it is possible to suppress the zero shift of the output voltage Vout due to temperature and static pressure.

In the present embodiment, the diaphragms 32, 33 have the same size. As in the case of the second embodiment, the sizes of the diaphragms 32, 33 may be changed to vary the sensitivities of the diaphragms 32, 33 for measuring a differential pressure.

Fourth Embodiment

Figure 11:
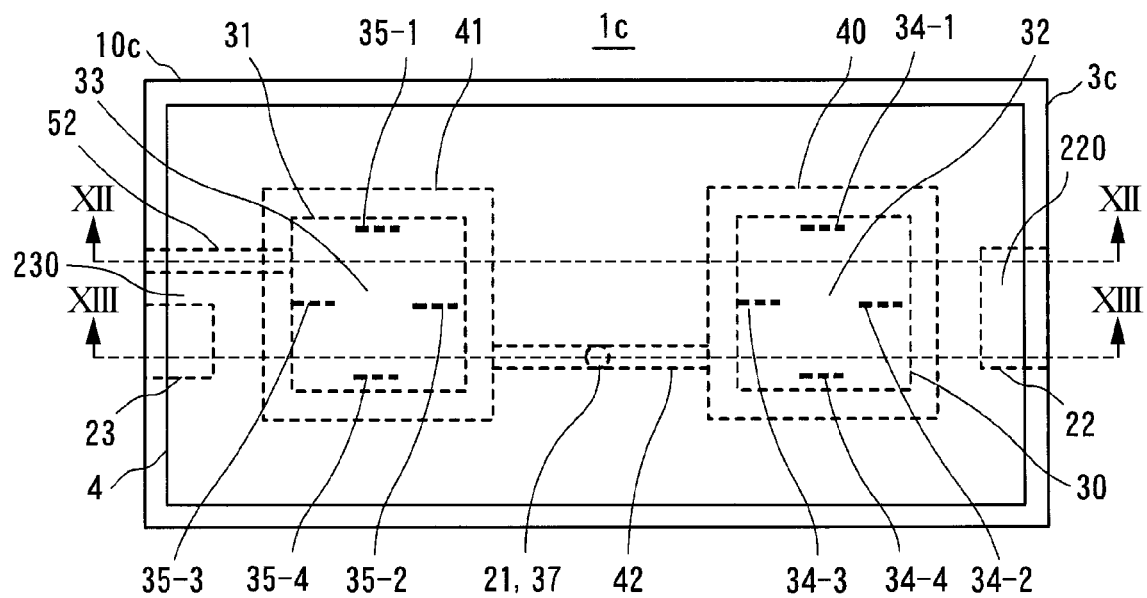
FIG. 11 is a plan view of a pressure sensor according to a fourth embodiment of the present disclosure.
Figure 12:
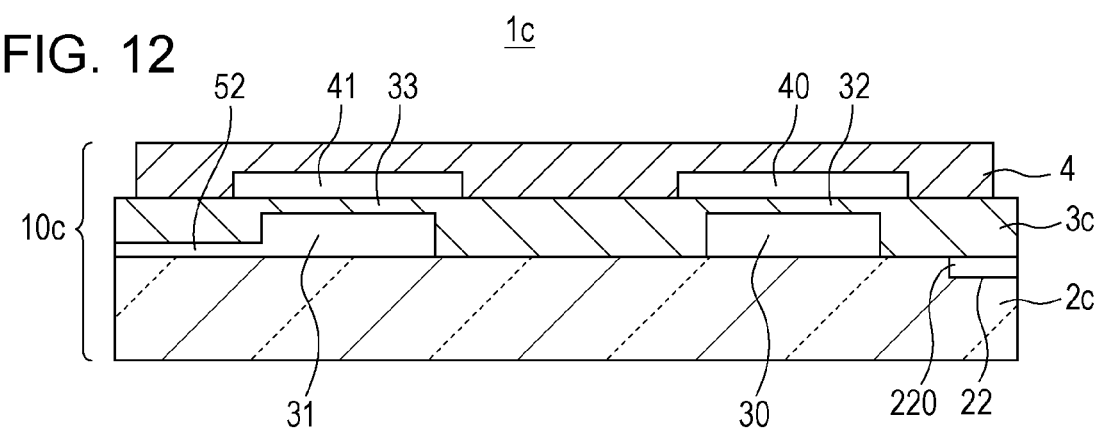
FIG. 12 is a cross-sectional view of the pressure sensor according to the fourth embodiment of the present disclosure.
Figure 13:
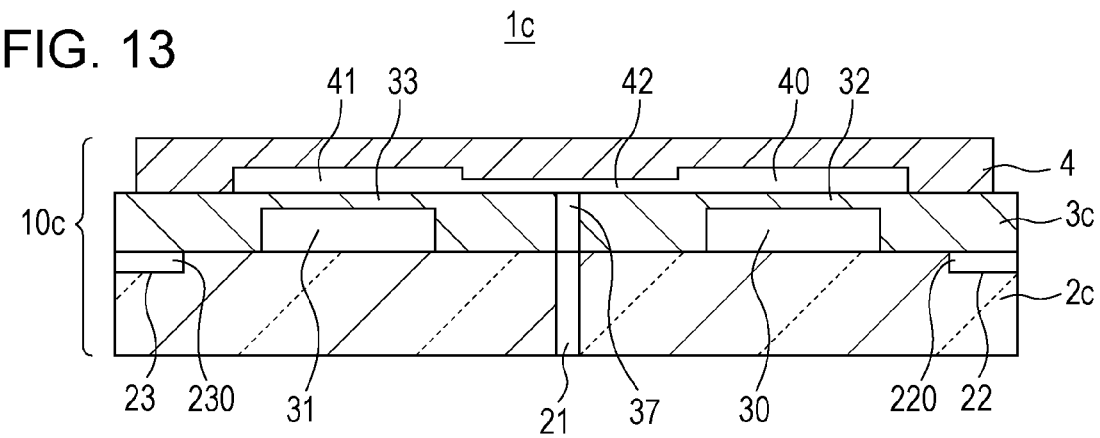
FIG. 13 is a cross-sectional view of the pressure sensor according to the fourth embodiment of the present disclosure.

Next, a fourth embodiment of the present disclosure will be described. FIG. 11 is a plan view of a pressure sensor according to the fourth embodiment of the present disclosure. FIG. 12 is a cross-sectional view taken along the line XII-XII in FIG. 11. FIG. 13 is a cross-sectional view taken along the line XIII-XIII in FIG. 11. The present embodiment is an example of measuring an absolute pressure and a gauge pressure at a time.

The pressure sensor 1c of the present embodiment is made up of a planar sensor chip 10c. The sensor chip 10c is made up of a planar base 2c (first member) made of Pyrex glass, a planar pressure sensing member 3c (second member) made of silicon and joined with the base 2c, and a planar lid member 4 (third member) made of silicon and joined with the pressure sensing member 3c. The lid member 4 is that as described in the first embodiment.

As in the case of the first embodiment, the base 2c has two grooves 22, 23. In addition, the base 2c has a through-hole 21 (first through-hole) that extends through the base 2c from a back surface to a front surface and that serves as a pressure inlet passage.

As in the case of the first embodiment, the pressure sensing member 3c has two recessed portions 30, 31, two diaphragms 32, 33, eight strain gauges 34-1 to 34-4, 35-1 to 35-4, and a through-hole 37.

A groove 52 (second groove) that serves as a pressure inlet passage is formed on the back surface of the pressure sensing member 3c. One end of the groove 52 communicates with the recessed portion 31, and the other end of the groove 52 is open at the side surface of the pressure sensing member 3c.

The base 2c and the pressure sensing member 3c are directly joined with each other such that the through-hole 21 of the base 2c and the through-hole 37 of the pressure sensing member 3c communicate with each other.

The pressure sensing member 3c and the lid member 4 are directly joined with each other such that the recessed portions 40, 41 of the lid member 4 respectively cover the diaphragms 32, 33 of the pressure sensing member 3c and the through-hole 37 of the pressure sensing member 3c and the groove 42 of the lid member 4 communicate with each other.

First oil is able to reach the top surfaces of the diaphragms 32, 33 via the through-holes 21, 37, the groove 42, and the recessed portions 40, 41. The recessed portion 30 on the bottom surface of the diaphragm 32 is hermetically sealed in a vacuum state. The atmospheric pressure is transmitted to the bottom surface of the diaphragm 33 via the groove 52 and the recessed portion 31.

The strain gauges 34-1 to 34-4 make up a Wheatstone bridge circuit for measuring an absolute pressure as shown in FIG. 4 together with an external circuit. With the Wheatstone bridge circuit for measuring an absolute pressure, it is possible to measure the absolute pressure of the first pressure applied to the top surface of the diaphragm 32.

The strain gauges 35-1 to 35-4 make up a Wheatstone bridge circuit for measuring a gauge pressure together with an external circuit. The Wheatstone bridge circuit for measuring a gauge pressure corresponds to the one in which the strain gauges 34-1 to 34-4 in FIG. 4 are replaced with the strain gauges 35-1 to 35-4. With the Wheatstone bridge circuit for measuring a gauge pressure, it is possible to measure the gauge pressure of the first pressure applied to the top surface of the diaphragm 33.

In the present embodiment, as well as the first embodiment, a cavity 220 is provided such that, when a difference between pressures applied to a top surface and bottom surface of the diaphragm 32 is zero, the output voltage Vout of the Wheatstone bridge circuit for measuring an absolute pressure is zero. In addition, a cavity 230 is provided such that, when a difference between pressures applied to a top surface and bottom surface of the diaphragm 33 is zero, the output voltage Vout of the Wheatstone bridge circuit for measuring a gauge pressure is zero.

In this way, in the present embodiment, by providing the two diaphragms 32, 33, it is possible to measure an absolute pressure and a gauge pressure at a time with high accuracy, and, by providing the cavities 220, 230, it is possible to suppress the zero shift of the output voltage Vout due to temperature and static pressure for each of an absolute pressure and a gauge pressure.

Fifth Embodiment

Figure 14:
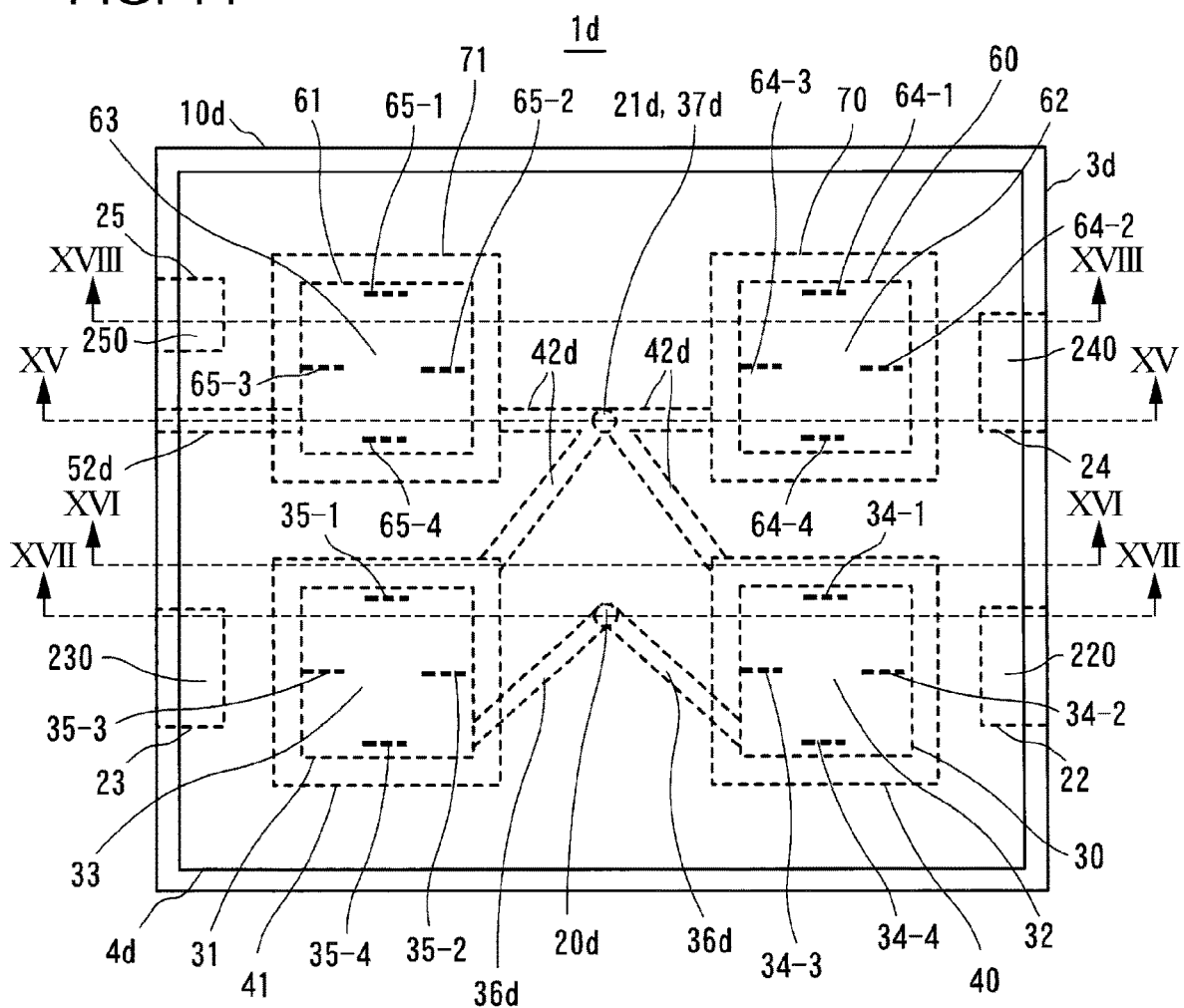
FIG. 14 is a plan view of a pressure sensor according to a fifth embodiment of the present disclosure.
Figure 15:
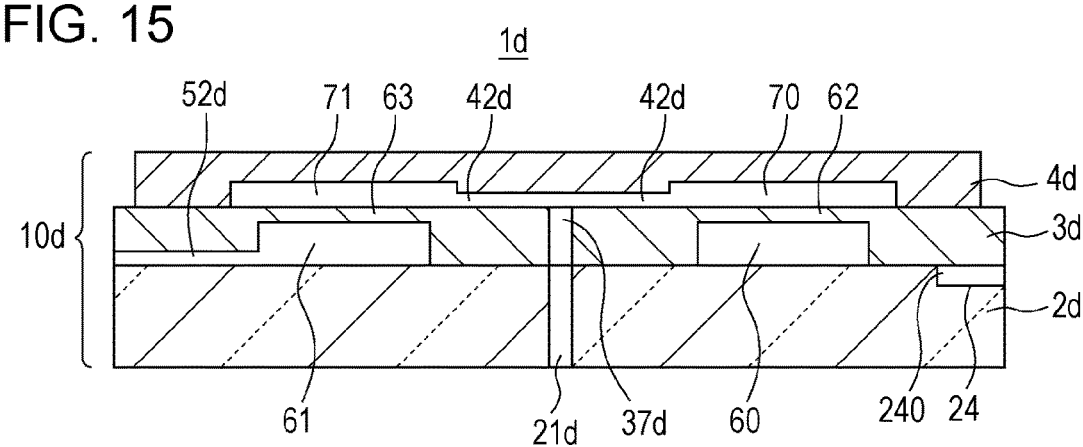
FIG. 15 is a cross-sectional view of the pressure sensor according to the fifth embodiment of the present disclosure.
Figure 16:
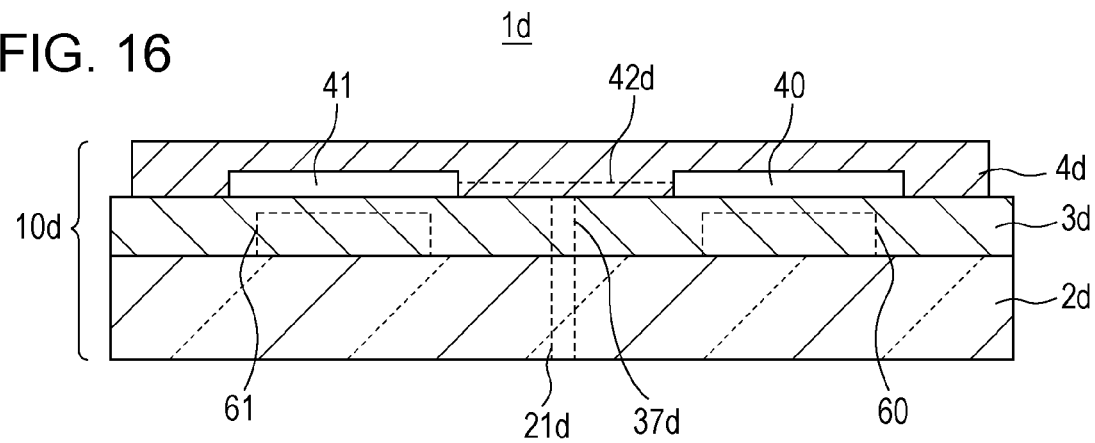
FIG. 16 is a cross-sectional view of the pressure sensor according to the fifth embodiment of the present disclosure.
Figure 17:
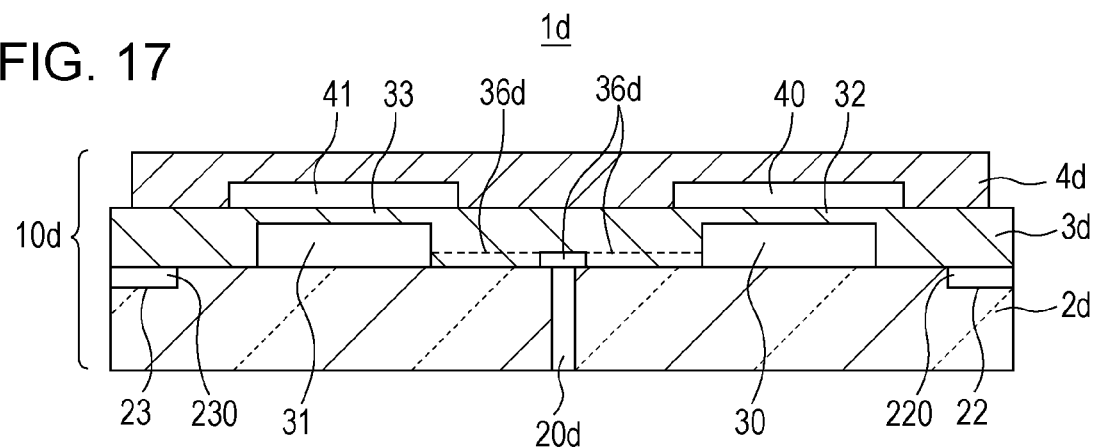
FIG. 17 is a cross-sectional view of the pressure sensor according to the fifth embodiment of the present disclosure.
Figure 18:
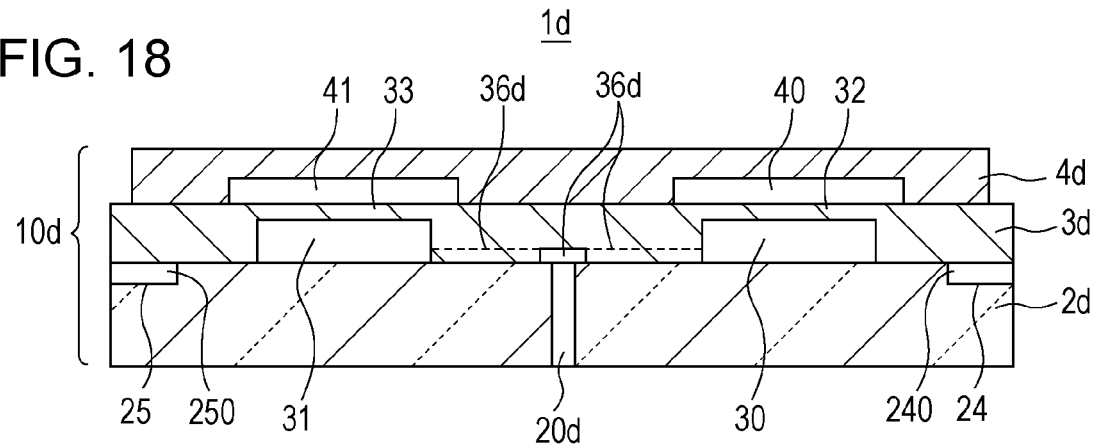
FIG. 18 is a cross-sectional view of the pressure sensor according to the fifth embodiment of the present disclosure.

Next, a fifth embodiment of the present disclosure will be described. FIG. 14 is a plan view of a pressure sensor according to the fifth embodiment of the present disclosure. FIG. 15 is a cross-sectional view taken along the line XV-XV in FIG. 14. FIG. 16 is a cross-sectional view taken along the line XVI-XVI in FIG. 14. FIG. 17 is a cross-sectional view taken along the line XVII-XVII in FIG. 14. FIG. 18 is a cross-sectional view taken along the line XVIII-XVIII in FIG. 14. The present embodiment is an example including four diaphragms.

The pressure sensor 1d of the present embodiment is made up of a planar sensor chip 10d. The sensor chip 10d is made up of a planar base 2d (first member) made of Pyrex glass, a planar pressure sensing member 3d (second member) made of silicon and joined with the base 2d, and a planar lid member 4d (third member) made of silicon and joined with the pressure sensing member 3d.

The base 2d has two through-holes 20d, 21d (first through-holes) that extend through the base 2d from the back surface to the front surface and that serve as pressure inlet passages. In addition, the base 2d has grooves 22 to 25 for providing cavities (described later).

Four square recessed portions 30, 31, 60, 61 (second pressure inlet chambers) are formed on the back surface of the pressure sensing member 3d, facing the base 2d. The recessed portions 30, 31, 60, 61 are formed by removing part of the back surface side of the pressure sensing member 3d such that the front surface side of the pressure sensing member 3d is left. Portions of the pressure sensing member 3d on the front surface sides of regions where the recessed portions 30, 31, 60, 61 are formed serve as diaphragms 32, 33, 62, 63.

A groove 36d (second groove) that serves as a pressure inlet passage is formed on the back surface of the pressure sensing member 3d. One end of the groove 36d communicates with the recessed portion 30, the other end of the groove 36d communicates with the recessed portion 31, and, when the base 2d and the pressure sensing member 3d are joined with each other, the middle portion of the groove 36d communicates with the through-hole 20d.

The pressure sensing member 3d has a through-hole 37d (second through-hole) at a location where, when the base 2d and the pressure sensing member 3d are joined with each other, the through-hole 37d communicates with the through-hole 21d. The through-hole 37d extends through the pressure sensing member 3d from the back surface to the front surface and serves as a pressure inlet passage.

Strain gauges 34-1 to 34-4, 35-1 to 35-4, 64-1 to 64-4, 65-1 to 65-4 are formed by a technique, such as impurity diffusion and ion implantation, at the peripheral portions of the diaphragms 32, 33, 62, 63 formed on the front surface sides of the regions of the recessed portions 30, 31, 60, 61 on the front surface of the pressure sensing member 3d, facing the lid member 4d. The strain gauges 34-1 to 34-4, 35-1 to 35-4, 64-1 to 64-4, 65-1 to 65-4 function as piezoresistive elements.

The strain gauges 34-1 to 34-4 are respectively formed near the middle points of the four sides of the square diaphragm 32 in plan view. The strain gauges 35-1 to 35-4 are respectively formed near the middle points of the four sides of the square diaphragm 33 in plan view. The strain gauges 64-1 to 64-4 are respectively formed near the middle points of the four sides of the square diaphragm 62 in plan view. The strain gauges 65-1 to 65-4 are respectively formed near the middle points of the four sides of the square diaphragm 63 in plan view.

The pressure sensing member 3d is made of a p-type monocrystal silicon of which the crystal plane orientation is a (100) plane. Each of the strain gauges 34-1 to 34-4, 35-1 to 35-4, 64-1 to 64-4, 65-1 to 65-4 is formed parallel to a crystal orientation of <110> at which a piezoresistive coefficient is maximum in the crystal plane orientation (100) of the pressure sensing member 3d.

A groove 52d (third groove) that serves as a pressure inlet passage is formed on the back surface of the pressure sensing member 3d. One end of the groove 52d communicates with the recessed portion 61, and the other end of the groove 52d is open at the side surface of the pressure sensing member 3d.

The lid member 4d is made of, for example, a p-type monocrystal silicon of which the crystal plane orientation is a (100) plane. Four square recessed portions 40, 41, 70, 71 (first pressure inlet chambers) are formed on the back surface of the lid member 4d, facing the pressure sensing member 3d, at locations where, when the pressure sensing member 3d and the lid member 4d are joined with each other, the diaphragms 32, 33, 62, 63 are covered. The recessed portions 40, 41, 70, 71 are formed by removing part of the back surface side of the lid member 4d such that the front surface side of the lid member 4d is left.

A groove 42d (first groove) that serves as a pressure inlet passage is formed on the back surface of the lid member 4d in such a shape that the groove 42d diverges from a center diverging point into four portions. Distal ends of the four portions respectively communicate with the recessed portions 40, 41, 70, 71, and, when the pressure sensing member 3d and the lid member 4d are joined with each other, a portion at the center diverging point communicates with the through-hole 37d.

The base 2d and the pressure sensing member 3d are directly joined with each other such that the through-hole 20d of the base 2d and the groove 36d of the pressure sensing member 3d communicate with each other and the through-hole 21d of the base 2d and the through-hole 37d of the pressure sensing member 3d communicate with each other.

The pressure sensing member 3d and the lid member 4d are directly joined with each other such that the recessed portions 40, 41, 70, 71 of the lid member 4d respectively cover the diaphragms 32, 33, 62, 63 of the pressure sensing member 3d and the through-hole 37d of the pressure sensing member 3d and the groove 42d of the lid member 4d communicate with each other.

First oil is able to reach the top surfaces of the diaphragms 32, 33, 62, 63 via the through-holes 21d, 37d, the groove 42d, and the recessed portions 40, 41, 70, 71. The first oil transmits an applied first pressure to the top surfaces of the diaphragms 32, 33, 62, 63. Second oil is able to reach the bottom surfaces of the diaphragms 32, 33 via the through-hole 20d, the groove 36d, and the recessed portions 30, 31. The second oil transmits an applied second pressure to the bottom surfaces of the diaphragms 32, 33. The recessed portion 60 on the bottom surface of the diaphragm 62 is hermetically sealed in a vacuum state. The atmospheric pressure is transmitted to the bottom surface of the diaphragm 63 via the groove 52d and the recessed portion 61.

The strain gauges 34-1 to 34-4 make up a Wheatstone bridge circuit for measuring a differential pressure as shown in FIG. 4 together with an external circuit. The strain gauges 35-1 to 35-4 make up a Wheatstone bridge circuit for measuring a differential pressure together with an external circuit. The Wheatstone bridge circuit made up of the strain gauges 35-1 to 35-4 corresponds to the one in which the strain gauges 34-1 to 34-4 in FIG. 4 are replaced with the strain gauges 35-1 to 35-4.

The strain gauges 64-1 to 64-4 make up a Wheatstone bridge circuit for measuring an absolute pressure together with an external circuit. The Wheatstone bridge circuit for measuring an absolute pressure corresponds to the one in which the strain gauges 34-1 to 34-4 in FIG. 4 are replaced with the strain gauges 64-1 to 64-4. The strain gauges 65-1 to 65-4 make up a Wheatstone bridge circuit for measuring a gauge pressure together with an external circuit. The Wheatstone bridge circuit for measuring a gauge pressure corresponds to the one in which the strain gauges 34-1 to 34-4 in FIG. 4 are replaced with the strain gauges 65-1 to 65-4.

In the present embodiment, as well as the first embodiment, a cavity 220 (groove 22) is provided such that, when a difference between pressures applied to a top surface and bottom surface of the diaphragm 32 is zero, the output voltage Vout of the Wheatstone bridge circuit for measuring a differential pressure, made up of the strain gauges 34-1 to 34-4, is zero. In addition, a cavity 230 (groove 23) is provided such that, when a difference between pressures applied to a top surface and bottom surface of the diaphragm 33 is zero, the output voltage Vout of the Wheatstone bridge circuit for measuring a differential pressure, made up of the strain gauges 35-1 to 35-4, is zero.

In addition, a cavity 240 (groove 24) is provided such that, when a difference between pressures applied to a top surface and bottom surface of the diaphragm 62 is zero, the output voltage Vout of the Wheatstone bridge circuit for measuring an absolute pressure, made up of the strain gauges 64-1 to 64-4, is zero. In addition, a cavity 250 (groove 25) is provided such that, when a difference between pressures applied to a top surface and bottom surface of the diaphragm 63 is zero, the output voltage Vout of the Wheatstone bridge circuit for measuring a gauge pressure, made up of the strain gauges 65-1 to 65-4, is zero.

In this way, in the present embodiment, by providing the four diaphragms 32, 33, 62, 63, it is possible to measure a differential pressure between the first pressure and the second pressure, an absolute pressure of the first pressure, and a gauge pressure of the first pressure at a time with high accuracy, and, by providing the cavities 220, 230, 240, 250, it is possible to suppress the zero shift of the output voltage Vout due to temperature and static pressure for each of a differential pressure, an absolute pressure, and a gauge pressure.

In the present embodiment, the same differential pressure is measured by the two diaphragms 32, 33, so only one of the diaphragms may be used, or the sizes of the diaphragms 32, 33 may be changed to vary the sensitivities of the diaphragms 32, 33 for measuring a differential pressure.

In the first to fifth embodiments, one cavity is provided for each diaphragm; however, at least one cavity may be provided for each diaphragm, and a plurality of cavities may be provided for each diaphragm. In the first to fifth embodiments, the shape of each cavity is a rectangular shape. Alternatively, the shape of each cavity may be a shape other than a rectangular shape.

The embodiments of the present disclosure are described in detail above with reference to the accompanying drawings. However, the technical scope of the present disclosure is not limited to those examples. It is apparent that persons having ordinary skill in the art of the present disclosure can conceive various modifications within the scope of the technical idea recited in the appended claims, and the technical scope of the present disclosure, of course, encompasses these modifications.

What is claimed is:

1. A pressure sensor, comprising:
   a planar sensor chip, wherein
   the sensor chip includes
   a plurality of diaphragms,
   a plurality of first pressure inlet chambers disposed so as to respectively adjoin top surfaces of the plurality of diaphragms,
   a plurality of second pressure inlet chambers disposed so as to respectively adjoin bottom surfaces of the plurality of diaphragms,
   a first pressure inlet passage of which one end is open at a bottom surface of the sensor chip and an other end communicates with at least one of the plurality of first pressure inlet chambers,
   a second pressure inlet passage of which one end is open at the bottom surface or a side surface of the sensor chip and an other end communicates with at least one of the plurality of second pressure inlet chambers, and
   a plurality of strain gauges disposed for each diaphragm at a peripheral portion of each of the plurality of diaphragms, and
   at least one cavity is provided for each diaphragm around the plurality of diaphragms so that, when a difference between pressures respectively applied to a top surface and a bottom surface of the diaphragm is zero, an output voltage of a Wheatstone bridge circuit made up of the plurality of strain gauges provided for the diaphragm is zero.

2. The pressure sensor according to claim 1, wherein the sensor chip includes
   two of each of the diaphragms, the first pressure inlet chambers, and the second pressure inlet chambers,
   one end of the first pressure inlet passage is open at the bottom surface of the sensor chip, and two other ends diverging from a location between the two first pressure inlet chambers respectively communicate with the two first pressure inlet chambers, and
   one end of the second pressure inlet passage is open at the bottom surface of the sensor chip, and an other end of the second pressure inlet passage communicates with one of the two second pressure inlet chambers.

3. The pressure sensor according to claim 1, wherein the sensor chip includes
   two of each of the diaphragms, the first pressure inlet chambers, and the second pressure inlet chambers,
   one end of the first pressure inlet passage is open at the bottom surface of the sensor chip, and two other ends diverging from a location between the two first pressure inlet chambers respectively communicate with the two first pressure inlet chambers, and
   one end of the second pressure inlet passage is open at the bottom surface of the sensor chip, and two other ends diverging from a location between the two second pressure inlet chambers respectively communicate with the two second pressure inlet chambers.

4. The pressure sensor according to claim 1, wherein the sensor chip includes
   two of each of the diaphragms, the first pressure inlet chambers, and the second pressure inlet chambers,
   one end of the first pressure inlet passage is open at the bottom surface of the sensor chip, an other end of the first pressure inlet passage communicates with one of the two first pressure inlet chambers, and a further other end of the first pressure inlet passage communicates with one of the two second pressure inlet chambers, and
   one end of the second pressure inlet passage is open at the bottom surface of the sensor chip, an other end of the second pressure inlet passage communicates with one of the two first pressure inlet chambers, not communicating with the first pressure inlet passage, and a further other end of the second pressure inlet passage communicates with one of the two second pressure inlet chambers, not communicating with the first pressure inlet passage.

5. The pressure sensor according to claim 1, wherein the sensor chip includes
   two of each of the diaphragms, the first pressure inlet chambers, and the second pressure inlet chambers,
   one end of the first pressure inlet passage is open at the bottom surface of the sensor chip, and two other ends diverging from a location between the two first pressure inlet chambers respectively communicate with the two first pressure inlet chambers, and
   one end of the second pressure inlet passage is open at the side surface of the sensor chip, and an other end of the second pressure inlet passage communicates with one of the two second pressure inlet chambers.

6. The pressure sensor according to claim 1, wherein the sensor chip includes
   four of each of the diaphragms, the first pressure inlet chambers, and the second pressure inlet chambers,
   one end of the first pressure inlet passage is open at the bottom surface of the sensor chip, and four other ends diverging from a location between the four first pressure inlet chambers respectively communicate with the four first pressure inlet chambers,
   one end of the second pressure inlet passage is open at the bottom surface of the sensor chip, and two other ends diverging from a location between the four second pressure inlet chambers respectively communicate with two of the four second pressure inlet chambers, and
   the sensor chip further has a third pressure inlet passage, of which one end is open at the side surface of the sensor chip and an other end communicates with one of the four second pressure inlet chambers, not communicating with the second pressure inlet passage.

7. The pressure sensor according to claim 2, wherein
   the sensor chip includes
   a planar first member,
   a planar second member joined with the first member, and
   a planar third member joined with the second member,
   the first pressure inlet chambers are provided at a location where the diaphragms provided at a top surface of the second member is covered, as two first recessed portions formed by removing part of a bottom surface side of the third member such that a top surface side of the third member is left,
   the second pressure inlet chambers are provided as two second recessed portions formed by removing a bottom surface side of the second member such that the diaphragms at a top surface side of the second member is left,
   the first pressure inlet passage includes a first through-hole extending through the first member from a bottom surface to a top surface, a second through-hole extending through the second member from a bottom surface to the top surface so as to communicate with the first through-hole, and a first groove provided at a bottom surface of the third member such that both ends respectively communicate with the two first recessed portions and a middle portion communicates with the second through-hole, the second pressure inlet passage includes a third through-hole extending through the first member from the bottom surface to the top surface, and a second groove provided at the bottom surface of the second member such that one end communicates with one of the two second recessed portions and an other end communicates with the third through-hole or such that both ends respectively communicate with the two second recessed portions and a middle portion communicates with the third through-hole, and the cavity is formed by a third groove provided at the top surface of the first member.

8. The pressure sensor according to claim 4, wherein the sensor chip includes
a planar first member,
a planar second member joined with the first member, and
a planar third member joined with the second member,
the first pressure inlet chambers are provided at a location where the diaphragms provided at a top surface of the second member is covered, as first recessed portions formed by removing part of a bottom surface side of the third member such that a top surface side of the third member is left,
the second pressure inlet chambers are provided as second recessed portions formed by removing a bottom surface side of the second member such that the diaphragms at a top surface side of the second member is left,
the first pressure inlet passage includes a first through-hole extending through the first member from a bottom surface to a top surface, a second through-hole extending through the second member from a bottom surface to the top surface so as to communicate with the first through-hole, a first groove provided at a bottom surface of the third member such that one end communicates with one of the two first recessed portions and an other end communicates with the second through-hole, and a second groove provided at the bottom surface of the second member such that one end communicates with one of the two second recessed portions and an other end communicates with the second through-hole,
the second pressure inlet passage includes a third through-hole extending through the first member from the bottom surface to the top surface, a fourth through-hole extending through the second member from the bottom surface to the top surface so as to communicate with the third through-hole, a third groove provided at the bottom surface of the third member such that one end communicates with one of the two first recessed portions, not communicating with the first pressure inlet passage, and an other end communicates with the fourth through-hole, and a fourth groove provided at the bottom surface of the second member such that one end communicates with one of the two second recessed portions, not communicating with the first pressure inlet passage, and an other end communicates with the fourth through-hole, and
the cavity is formed by a fifth groove provided at the top surface of the first member.

9. The pressure sensor according to claim 5, wherein the sensor chip includes
a planar first member,
a planar second member joined with the first member, and
a planar third member joined with the second member,
the first pressure inlet chambers are provided at a location where the diaphragms provided at a top surface of the second member is covered, as first recessed portions formed by removing part of a bottom surface side of the third member such that a top surface side of the third member is left,
the second pressure inlet chambers are provided as second recessed portions formed by removing a bottom surface side of the second member such that the diaphragms at a top surface side of the second member is left,
the first pressure inlet passage includes a first through-hole extending through the first member from a bottom surface to a top surface, a second through-hole extending through the second member from a bottom surface to the top surface so as to communicate with the first through-hole, and a first groove provided at a bottom surface of the third member such that both ends respectively communicate with the two first recessed portions and a middle portion communicates with the second through-hole,
the second pressure inlet passage includes a second groove provided at the bottom surface of the second member such that one end is open to the side surface of the second member and an other end communicates with one of the two second recessed portions, and
the cavity is formed by a third groove provided at the top surface of the first member.

10. The pressure sensor according to claim 6, wherein the sensor chip includes
a planar first member,
a planar second member joined with the first member, and
a planar third member joined with the second member,
the first pressure inlet chambers are provided at a location where the diaphragms provided at a top surface of the second member is covered, as four first recessed portions formed by removing part of a bottom surface side of the third member such that a top surface side of the third member is left,
the second pressure inlet chambers are provided as two second recessed portions formed by removing a bottom surface side of the second member such that the diaphragms at a top surface side of the second member is left,
the first pressure inlet passage includes a first through-hole extending through the first member from a bottom surface to a top surface, a second through-hole extending through the second member from a bottom surface to the top surface so as to communicate with the first through-hole, and a first groove provided at a bottom surface of the third member such that four distal ends diverging from a location between the four first recessed portions respectively communicate with the four first recessed portions and a portion at the diverging location communicates with the second through-hole,
the second pressure inlet passage includes a third through-hole extending through the first member from a bottom surface to a top surface, and a second groove provided at the bottom surface of the second member such that both ends respectively communicate with the two second recessed portions and a middle portion communicates with the third through-hole, the third pressure inlet passage includes a third groove provided at the bottom surface of the second member such that one end is open at the side surface of the second member and an other end communicates with one of the four second recessed portions, not communicating with the second pressure inlet passage, and the cavity is formed by a fourth groove provided at the top surface of the first member.

11. The pressure sensor according to claim 1, wherein the four strain gauges are provided for each diaphragm, the Wheatstone bridge circuit includes
- a first series circuit provided by serially connecting the first and second strain gauges out of the four strain gauges,
- a second series circuit provided by serially connecting the third and fourth strain gauges out of the four strain gauges, and
- a power supply that applies a driving voltage to both ends of the first series circuit and both ends of the second series circuit, and
- the cavity is formed such that, when a difference between pressures respectively applied to a top surface and bottom surface of the diaphragm is zero, the output voltage that is output from between a connection point of the first and second strain gauges and a connection point of the third and fourth strain gauges is zero.

* * * * *